2,979,424

METAL COATED GLASS FIBERS AND METHOD OF MAKING THEM

Harry B. Whitehurst, Albert R. Morrison, and Theodore J. Collier, Newark, Ohio, assignors to Owens-Corning Fiberglas Corporation, a corporation of Delaware No Drawing. Filed Sept. 17, 1953, Ser. No. 380,868

7 Claims. (Cl. 117—227)

This invention relates to the manufacture of glass fibers having a metallic coating formed on the surfaces thereof to improve the characteristics, appearance and properties of the glass fibers and to broaden the use of glass fibers into fields not heretofore adapted to the use of glass fibers and in problems which have heretofore been incapable of solution with materials which have heretofore been produced.

A simplified flow diagram of the process is as follows:

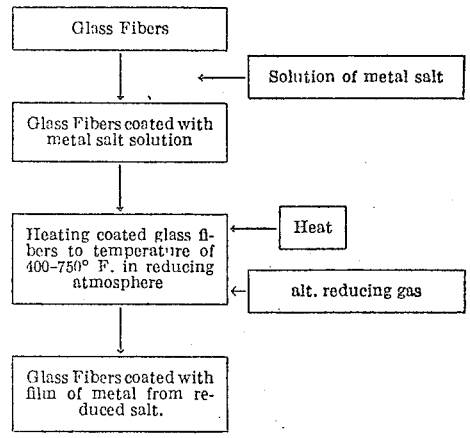

As used herein, the term "fibers" is meant to include staple fibers of discontinuous length which range in thickness from 0.00002 inch to about 0.004 inch; continuous fibers such as are used for many textiles and which have diameters within the range of about 0.0002 to about 0.0006 inch; and very thin forms of glass such as films of less than 10 mils thickness. Characteristic of the material included herein under the term "fibers" is the tremendous surface area per unit weight of the material.

The metal coating formed on the surfaces of the glass fibers in accordance with the practice of this invention functions, in one sense, in the manner of a size to protect the glass fibers against destruction by forces of abrasion and also to impart greater flexural endurance or resistance to breaking upon flexure. When the metal film formed on the surfaces of the glass fibers is limited in thickness to less than .00015 inch, glass fibers, such as are used for the manufacture of fabrics and textiles, retain their flexibility sufficient for continued use as a textile fiber while the metallic film greatly increases the flexural endurance thereof. The improvement which results in the abrasion resistance and flexure endurance of metallic coated glass fibers constitutes an important advance where the glass fibers, in use, have a tendency to rub one upon another, as when used as a reinforcement in the manufacture of tire cord and the like.

In addition to the function of the metallic coating as a protective agent when present as a substantially continuous film on the surfaces of the filaments of glass fibers, the film of metal on the glass fiber surfaces imparts a number of new and novel characteristics which enables better use of glass fibers in a number of present applications and adapts the glass fibers for uses in applications which have formed the subject of intensive research and a number of uses advantageously to replace materials now on the market depending, of course, upon the metal of which the coating is formed and the novel characteristics which result when on the glass fiber surfaces.

When the coating on the surface is formed of a metal capable of good electrical conductivity, such as of copper, silver, gold, nickel and the like, the large surface area per unit weight of the fibers enables use as an electrical conductor having greater capacity than a copper wire of equivalent weight, particularly in high frequency transmission where the surface portion only constitutes the conductor. The resistance to atmosphere attack of glass and the exceptionally high strengths of the glass fibers, especially in the longitudinal direction, permits the production of conductors characterized by high strengths and greater electrical capacity.

The novel characteristics of a glass fiber coated with a continuous conductive film of metal provide a number of additional important uses which cannot at this time be fully divulged but which provide the solution to a number of important problems incapable of being overcome with materials which have been made available to the present. In addition to the improvements which result when used as an electrical conductor, metal formed as a substantially continuous film on the glass fiber surfaces increases the utility of the glass fibers as a heat barrier because of the ability of the fibers to reflect the heat waves striking the surfaces thereof. Yet, on the other hand, the glass fibers heretofore known for their poor heat conductivity, become excellent heat conductors especially when coated by copper or other metals characterized by high heat transfer.

To the present, metal coatings have been formed on the glass fiber surfaces, preferably in combination with forming, by drawing the fibers after attenuation but while still in a heated condition through a bead of the molten metal. By this means, metals such as zinc, tin-silver alloy, Woods alloy, Roses alloy, and lead, and alloys such as lead-indium, have been applied to form a substantially continuous coating on the glass fiber surfaces in thicknesses of about .00004 inch which is sufficient to impart a metallic color and to form a conductive surface. To the present, metals such as gold, silver, copper and aluminum have been incapable of being incorporated as films on glass fibers by the processes described.

The processes for forming a metal coating on glass fiber surfaces are limited by the fact that it is undesirable to reheat glass fibers subsequent to fiber formation. As in fibers formed of synthetic resinous materials where fiber strength is increased by molecular orientation upon stretching in the lengthwise direction, it is believed that maximum strength in glass fibers is also developed when frozen in an expanded or stretched condition. Since the glass fibers have tremendous surface area per unit weight, as described, it is possible to freeze the glass fibers in an expanded state by rapid cooling upon attenuation. Corresponding results cannot be developed in a large mass of glass where the surface area is relatively low per weight basis. Upon reheating glass fibers, return to a relaxed state occurs slowly at temperatures of about 400–500° F. and very rapidly at 750° F. with corresponding effect on the strength properties of the glass fibers. Thus it becomes desirable to provide a method for coating glass fibers with metal without having to heat the fibers to a temperature much beyond 400–500° F., although slight loss in strength properties is permissible in certain applications because, in many applications, the strengths of glass fibers are considerably higher than necessary.

It is an object of this invention to produce metallic coated glass fibers and to provide a method for producing same without excessive deterioration of the glass and without harmfully affecting the flexibility thereof or the use thereof in their various applications.

It is another object to provide a method for the formation of a substantially continuous coating of a metal or metals on glass fiber surfaces and it is a related object to provide a method of the type described which is adaptable for coating the fibers as a substantially continuous operation, preferably in connection with fiber formation, and without causing excessive losses in the physical strength properties of the glass fibers or the characteristics thereof for use as a textile material or other applications.

A further object is to produce one or more metallic films on glass fibers by chemical or physical-chemical reactions with materials existing or provided on the glass fiber surfaces and it is a related object to produce new and improved articles of manufacture in the form of glass fibers having a metallic coating or coatings formed as a substantially continuous film on the surfaces thereof.

A desirable concept for the preparation of a metallic film on the surfaces of glass fibers in the absence of heat of the order which causes excessive deterioration of the properties of glass fibers, as heretofore described, resides in the formation of the metallic film on the glass fiber surfaces by conversion in response to chemical reaction from a salt present as a coating on the glass fiber surfaces. Reaction for conversion of the metallic salt to a film of the corresponding metal has been achieved in accordance with the practice of this invention (1) by decomposition whereby the salt breaks down in a manner to produce a metal at a temperature low enough, with some salts, to avoid excessive deterioration in the strength properties of the glass fibers, and (2) by reduction reaction directly without oxide formation as an intermediate in the presence of a reducing atmosphere at a temperature sufficient to effect rapid reaction but insufficient to cause excessive deterioration of the glass fibers.

Application to provide the salts on the glass fiber surfaces for reactions of the types previously described may be achieved in many ways and by conventional coating processes. A solution or dispersion of the salt may be used or the salt may be introduced with a carrier such as a size which functions to hold the salt on the glass fiber surfaces in sufficient amounts to produce the desired results. It is preferred to coat the glass fibers with a solution of the salt so as to enable elimination of the diluent in an expedient manner, while leaving the salt uniformly distributed as a thin coating over the glass fiber surfaces for reaction without interference by the carrier and without the problems that might arise when it is necessary first to eliminate the carrier before metal formation by the desired reduction reaction. The salts may be applied to glass fiber surfaces without any previous coatings or sizes thereon or from which any size compositions have been removed as by rinsing or burning off. The salt compositions may also be applied to glass fibers having their surfaces roughened by an etching process or in which the glass fibers have been leached to remove all but the silica, as previously described.

The number of salts which can be used for metal formation by thermal decomposition on glass fiber surfaces are very limited. Most of the salts tend to break down to form the metal oxide upon thermal decomposition, as previously described in the process of metal formation by reduction of the corresponding metal oxide, but it has been found that copper formate, silver formate, gold formate, and the noble metal chlorides such as the chlorides of palladium, platinum, gold and silver and the like break down in a peculiar manner directly to form the metal instead of the oxide upon decomposition on the glass fiber surfaces. In addition, other compounds, such as tetraethyl lead and zinc triphenyl methyl, also break down to form the corresponding metal upon decomposition at fairly low temperatures.

While decomposition of the compounds of the types described can be achieved independent of the thickness of the coating on the glass fiber surfaces, it has been found best to make use of extremely thin layers for more complete break-down to form the corresponding metal using minimum temperature and time. The concepts of this phase of the invention may be illustrated by the following:

*Example 1*

Copper formate in amounts ranging from 10–30 percent by weight was compounded into molten wax and formed into an applicator stick. Glass fibers in forming, or separate and apart therefrom, were drawn over the stick and became coated with a thin film of the wax-copper formate composition.

Upon heating the coated fibers to a temperature slightly in excess of 450° F., the formate was eliminated, leaving the copper in metallic form as a coating on the glass fiber surfaces. Although the coating was only a few molecules thick, additional thicknesses could be produced by application of a heavier wax coat or by repeating the coating and heating cycle, but once the copper film was formed on the glass, additional thicknesses could also be achieved, if desired, by electroplating.

*Example 2*

Glass fibers treated with a conventional size such as is formed of polyethylene glycols or oils, alone or in combination with other substances which will volatilize rather cleanly from the glass fiber surfaces, are immersed for about 5 minutes in a saturated solution of silver formate. After drying, the treated glass fibers are heated to a temperature within the range of 400–500° F. for less than 1 minute. The silver formate decomposes in a manner to eliminate the formate and deposit the silver as a substantially continuous metallic film on the glass fiber surfaces.

*Example 3*

In another method embodying the concepts of heat decomposition, copper formate in a 10 percent solution with a lubricating oil was applied as a coating to glass fiber surfaces. While being heated to an elevated temperature within the range of 400–450° F., the oil was ignited. While burning off, the oil supplied sufficient additional heat to decompose the salt and deposit copper as a metal coating on the bare glass fiber surfaces.

*Example 4*

In still another process, glass fibers are merely coated in forming with copper formate in solution in a solvent medium in amounts ranging from 5–20 percent by weight. The fibers are then heated to a temperature of about 400° F. to eliminate formate, leaving the copper as a metal coating on the glass fiber surfaces.

For reduction reaction at elevated temperatures in the presence of a reducing atmosphere, such as carbon monoxide or hydrogen, use may be made of the metal salts of the types previously described as suitable for metal formation solely by thermal decomposition. With these materials, the reducing atmosphere increases the rate of reaction and lowers the temperature necessary for conversion. In addition to the salts described, the metal halides, such as the iodides, bromides and chlorides, decompose to form a metal upon reduction at elevated temperature in an atmosphere of hydrogen, carbon monoxide or other suitable gaseous reducing agent. The acetates, carbonates and formates of the corresponding metals may also be used and are preferred in many instances because they are easier to break down by reduction reaction at elevated temperature. Other salts in which the metallic component is contained in the anion may also be used, such as the plumbates, stannates, dichromates, but preferably as the salt of ammonia which is easily volatilized off and also assists in maintaining the desired reducing atmosphere.

Reaction at lower temperature results when carbon monoxide is used as the reducing agent as compared to hydrogen. With carbon monoxide, reduction reaction, especially of the metal acetates, formates and carbonates, may be achieved at temperatures below that capable of destroying the properties of the glass fibers, depending upon the stability of the salt and the concentration thereof on the glass fiber surfaces. With hydrogen, the temperature required may be slightly higher than that necessary with carbon monoxide unless the hydrogen is ionized.

It should be sufficient briefly to set forth but one process for the practice of this concept, it being understood that other metal salts of the types previously described may be substituted in the example and that hydrogen may be used instead of carbon monoxide, but with slightly higher temperature unless ionized.

*Example 5*

Glass fibers in filament form are coated with a 10 percent solution of tin chloride. After drying the fibers having the tin chloride formed as a film on the surfaces thereof are heated in a chamber maintained at a temperature of 450° F. and into which carbon monoxide is bled to maintain a reducing atmosphere. After about 15 seconds to 2 minutes or longer, the tin chloride becomes reduced to deposit a film of tin on the glass fiber surfaces. Although the film is of minimum thickness, it is capable of electrical conductivity and can be used as a base upon which a film of greater thickness, if desired, may be deposited by electroplating or upon which a film of another metal may be formed.

It will be understood that this concept may be used to form substantially any metal on the glass fiber surfaces when the corresponding chlorides, iodides, bromides, carbonates, acetates or formates and the like are deposited as a salt on the glass fiber surfaces for thermal reduction in a reducing atmosphere.

After metal coating, various treatments may be applied to the coated fibers to assist in the further processing thereof. For example, a lubricant and binder may be applied to assist in the plying and twisting operation for yarn formation and weaving into a textile. As previously described, when aluminum is present as the metal coat, the aluminum can be anodized or the surface of aluminum or other metals can serve as a mordanting base for dyeing to produce glass fibers having permanent color.

The improvement in phylsical properties is dependent greatly upon the metal formed as a coating on the glass fiber surfaces. For example, a glass fiber of 0.0004 inch in diameter and having a flexure endurance of 22.2 minutes is increased in flexure endurance to 32.3 hours when a coating of 0.00004 inch is formed of zinc in the manner described on the surfaces of the fibers and the flexure endurance is increased to the point where the fiber does not break after 916 hours of test when the same fiber is coated with 0.00004 inch copper. Though not as high, excellent improvements in flexure endurance are also secured when the fibers are coated with films of similar thicknesses formed of lead, with alloys of lead, and indium coatings.

It will be apparent from this description that there is provided a new and novel system for producing metal coatings on glass fibers without excessive deterioration of the properties thereof. The metal coatings on the fibers have been found to function somewhat as a size to protect the fibers against destruction in use and they function also to improve the properties of the glass fibers particularly with respect to flexure endurance. The metal coated fibers embody many new and novel characteristics which make them available for use in substitution of other materials in applications such as electrical conductors, heat insulators, electrical screening members and the like, and they also provide new and improved compositions of matter having many applications incapable of being supplied by materials now on the market.

It will be understood that invention exists not only in the methods for securing metal coatings on the glass fiber surfaces in a manner to permit continuous and rapid operation and without excessive deterioration of properties, but that invention exists also in the metal coated fibers themselves, particularly in combinations where one metal constitutes the inner layer for the desired orientation with the glass fiber surfaces while the outer coat provides specific properties, such as electrical conductivity, resistance to oxidation, thermal conductivity, heat reflection and the like.

It will be understood that changes may be made in the details of the operation, the methods of application of the various compositions and in many of the conditions under which reaction takes place, without departing from the spirit of the invention, especially as defined in the following claims.

We claim:

1. The method of producing glass fibers having a thin film of metal formed on the surfaces thereof without excessive deterioration of the physical and mechanical properties of the glass fibers comprising the steps of treating the glass fiber surfaces to prepare the surfaces for receiving a coating of a metal compound reducible at elevated temperatures in a reducing atmosphere to the corresponding metal, coating the treated glass fibers with the reducible metal compound, heating the coated glass fibers to a temperature sufficient for thermal reduction of the metallic compound on the glass fiber surfaces but below the temperature for fusion of the glass composition of which the fibers are formed, and maintaining a reducing atmosphere during heat treatment to convert the metallic compound to a metal in situ on the glass fiber surfaces.

2. The method of producing individual filaments of glass having a thin film of metal formed on the surfaces thereof without excessive deterioration of the physical and mechanical properties of the glass fibers, comprising coating the individual filaments of glass fibers with a thin layer of a metallic salt which decomposes at elevated temperatures below softening temperature for the glass composition of which the filaments are formed directly to form the corresponding metal in situ on the glass fiber surfaces, heating the coated fibers to decomposition temperature of the salt whereby the salt breaks down to form a metallic film of the corresponding metal on the glass fiber surfaces.

3. The method as claimed in claim 2 in which the metallic salt is selected from the group consisting of the formates, acetates and chlorides of copper and the noble metals.

4. Glass fibers having a metallic film formed on the surfaces thereof by the method claimed in claim 2.

5. The method of producing glass fibers having a thin film of metal formed on the surfaces thereof without excessive deterioration of the physical and mechanical properties of the glass fibers, comprising sizing the individual glass fibers to coat the glass filaments with a thin coating formed of an oil vehicle and the formate of a metal selected from the group consisting of copper and the noble metals contained in an oil vehicle, heating the coated glass fibers to an elevated temperature above 400° F. but below 750° F., to ignite the oil whereby the metallic salt decomposes to eliminate the formate and deposit the metal as a thin film on the surfaces of the individual glass fiber.

6. The method of producing individual glass fibers having a thin film of metal formed on the surfaces thereof without excessive deterioration of the physical and mechanical properties of the glass fibers, comprising the steps of coating the individual glass fibers with a thin layer of a metal salt, exposing the coated glass fibers to a reducing atmosphere, heating the glass fibers while in the reducing atmosphere to a temperature to reduce the salt on the glass fiber surfaces and release the metallic component to form a metal film on the glass fiber surfaces.

7. The method as claimed in claim 6 in which the reducing atmosphere is formed of hydrogen, carbon monoxide and ionized hydrogen and in which the coated fibers are heated to a temperature below 750° F. but more than 400° F. while in the reducing atmosphere.

References Cited in the file of this patent

UNITED STATES PATENTS

| | | |
|---|---|---|
| 986,558 | Farkas | Mar. 14, 1911 |
| 2,233,622 | Lytle | Mar. 4, 1941 |
| 2,251,913 | Brennan | Aug. 12, 1941 |
| 2,303,756 | Nordberg et al. | Dec. 1, 1942 |
| 2,328,101 | Rosenblatt | Aug. 31, 1943 |
| 2,331,944 | Pazsiczky et al. | Oct. 19, 1943 |
| 2,375,178 | Ruben | May 1, 1945 |
| 2,407,483 | Ebaugh | Sept. 10, 1946 |
| 2,430,520 | Marboe | Nov. 11, 1947 |
| 2,461,841 | Nordberg | Feb. 15, 1949 |
| 2,562,182 | Godley | July 31, 1951 |
| 2,577,936 | Waggoner | Dec. 11, 1951 |
| 2,593,818 | Waggoner | Apr. 22, 1952 |
| 2,610,220 | Brennan | Sept. 9, 1952 |
| 2,616,165 | Brennan | Nov. 4, 1952 |
| 2,662,036 | Levi | Dec. 8, 1953 |
| 2,699,415 | Nachtman | Jan. 11, 1955 |
| 2,762,168 | Cutchen | Sept. 11, 1956 |
| 2,930,105 | Wrotnowski | Mar. 29, 1960 |

FOREIGN PATENTS

| | | |
|---|---|---|
| 566,718 | Great Britain | Aug. 16, 1944 |
| 626,357 | Great Britain | July 13, 1949 |

OTHER REFERENCES

Wein: Metal Finishing, August 1948 (pages 58-60 and 69 relied upon).